US012686394B2

(12) United States Patent
Lee et al.

(10) Patent No.: US 12,686,394 B2
(45) Date of Patent: Jul. 21, 2026

(54) METHOD AND SYSTEM FOR MITIGATING MOTION SICKNESS IN PASSENGERS

(71) Applicants:Hyundai Motor Company, Seoul
(KR); Kia Corporation, Seoul (KR)

(72) Inventors: Gyu Ri Lee, Namyangju-si (KR);
Seong Wook Moon, Seoul (KR); Do Hwa Kim, Seoul (KR); Sung Bae Jeon, Hwaseong-si (KR); Sung Il Jung, Busan (KR); Jae Young Park, Seongnam-si (KR); Jeong Eun Kim, Seongnam-si (KR); Hui Un Son, Suwon-si (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 171 days.

(21) Appl. No.: 18/347,248

(22) Filed: Jul. 5, 2023

(65) Prior Publication Data

US 2024/0174241 A1      May 30, 2024

(30) Foreign Application Priority Data

Nov. 29, 2022    (KR) ........................ 10-2022-0162847

(51) Int. Cl.
B60W 50/00          (2006.01)
(52) U.S. Cl.
CPC ..... B60W 50/0098 (2013.01); B60W 2540/22
(2013.01)
(58) Field of Classification Search
CPC ................................................. B60W 2540/22
See application file for complete search history.

(56) References Cited

U.S. PATENT DOCUMENTS

| | | | |
|---|---|---|---|
| 10,942,037 B1 | 3/2021 | Larner et al. | |
| 2007/0198183 A1 | 8/2007 | Morimoto et al. | |
| 2008/0062008 A1 | 3/2008 | Morimoto et al. | |
| 2018/0052000 A1 | 2/2018 | Larner et al. | |
| 2019/0269321 A1 | 9/2019 | Murakami et al. | |
| 2020/0353934 A1 | 11/2020 | Vulcu | |
| 2021/0318539 A1 | 10/2021 | Profendiner | |
| 2022/0001893 A1* | 1/2022 | Tartz | A61B 5/7282 |

(Continued)

FOREIGN PATENT DOCUMENTS

| | | |
|---|---|---|
| EP | 3500902 A1 | 6/2019 |
| EP | 3816583 A1 | 5/2021 |

(Continued)

*Primary Examiner* — Imran K Mustafa
(74) *Attorney, Agent, or Firm* — Slater Matsil, LLP

(57)          ABSTRACT

A method of mitigating motion sickness in a passenger including learning a motion sickness prediction model based on state information of a vehicle or the passenger, reaction information of the passenger, and motion sickness-related information, predicting reactions of the passenger to a current state of the vehicle or the passenger and possibility of motion sickness using the learned motion sickness prediction model, and providing information on the motion sickness mitigation methods to the passenger or controlling the vehicle based on the predicted reactions of the passenger and possibility of motion sickness. The motion sickness-related information includes one or more of a determination result of whether motion sickness occurs to the passenger, motion sickness state information, and motion sickness reaction information.

20 Claims, 5 Drawing Sheets

(56)     References Cited

U.S. PATENT DOCUMENTS

| | | | |
|---|---|---|---|
| 2022/0016998 A1 | 1/2022 | Kusayanagi et al. | |
| 2022/0135054 A1* | 5/2022 | Nakamura ............ | A61B 5/1114 |
| | | | 701/1 |

FOREIGN PATENT DOCUMENTS

| | | | |
|---|---|---|---|
| JP | 2004301692 | A | 10/2004 |
| JP | 2005326962 | A | 11/2005 |
| JP | 2006007867 | A | 1/2006 |
| JP | 2006034760 | A | 2/2006 |
| JP | 2006035980 | A | 2/2006 |
| JP | 2006036012 | A | 2/2006 |
| JP | 4882433 | B2 | 2/2012 |
| JP | 2012251913 | A | 12/2012 |
| JP | 2014167438 | A | 9/2014 |
| JP | 2018106490 | A | 7/2018 |
| JP | 2018112850 | A | 7/2018 |
| JP | 2019532257 | A | 11/2019 |
| JP | 2020185378 | A | 11/2020 |
| JP | 2021175640 | A | 11/2021 |
| JP | WO2020170640 | A1 | 11/2021 |
| KR | 20150083354 | A | 7/2015 |
| KR | 20170064909 | A | 6/2017 |
| KR | 20190025756 | A | 3/2019 |
| KR | 20190126198 | A | 11/2019 |
| KR | 20220051061 | A | 4/2022 |

* cited by examiner

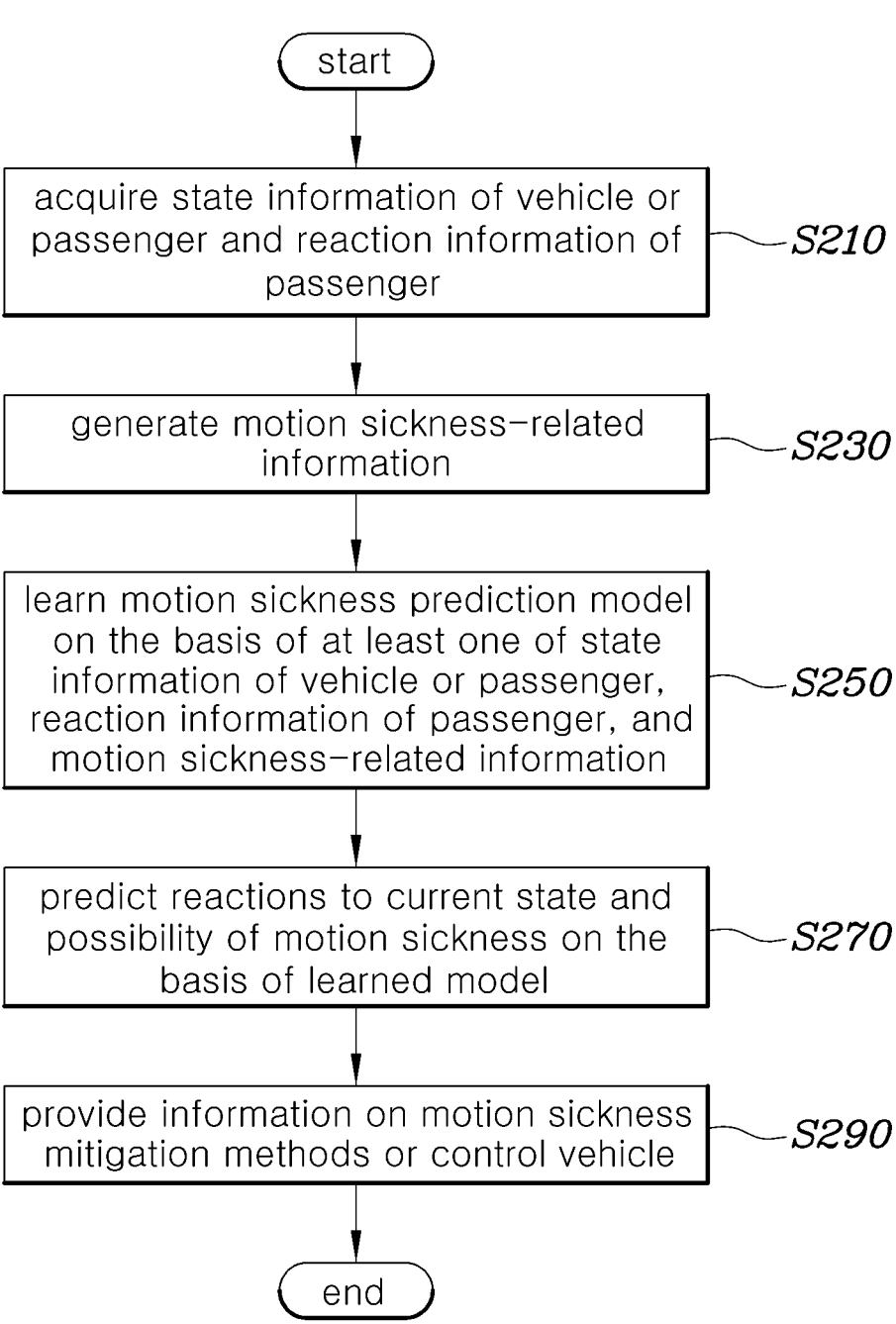

start acquire state information of vehicle or passenger and reaction information of passenger — S210 generate motion sickness-related information — S230 learn motion sickness prediction model on the basis of at least one of state information of vehicle or passenger, reaction information of passenger, and motion sickness-related information — S250 predict reactions to current state and possibility of motion sickness on the basis of learned model — S270 provide information on motion sickness mitigation methods or control vehicle — S290 end

METHOD AND SYSTEM FOR MITIGATING MOTION SICKNESS IN PASSENGERS

CROSS-REFERENCE TO RELATED APPLICATIONS

The present application claims priority to Korean Patent Application No. 10-2022-0162847, filed on Nov. 29, 2022, the entire contents of which is incorporated herein for all purposes by this reference.

TECHNICAL FIELD

The present invention relates to a method and system for mitigating motion sickness in passengers.

BACKGROUND

Exposure to one or more specific motions over an extended period may cause motion sickness. At this time, factors such as temperature, smell, mood, and digestion may contribute to motion sickness.

Motion sickness which accompanies dizziness and vomiting when riding a vehicle is caused by temporary confusion in the brain when there is a discrepancy in inputs between sensory organs (vision, somatosensory, semicircular canal, etc.) that maintain balance or detect movements and postures.

Conventional car sickness prevention technology includes technology by which a vehicle determines whether a passenger is currently experiencing motion sickness or is about to feel sick soon through biometric sensors. The vehicle may adjust the interior environment and driving style by itself according to the information obtained through the sensors and mitigate motion sickness in the passenger.

An example of technology in the related art may be the recording of a 'well-being score' by measuring the physical changes of the passenger in real time as the vehicle starts to drive. The well-being score is data obtained by quantifying the stress experienced by people susceptible to motion sickness using biometric sensors that record physiological signals. When the passenger is exposed to an external stimulus such as reading a book or a physical change such as a rise in the body temperature is detected in the passenger, when the passenger will experience motion sickness may be predicted through a comparison with existing data.

When it is determined that motion sickness may occur, the vehicle may start setting itself up to minimize the likelihood of motion sickness. For example, the travel setting of the suspension may be adjusted every $\frac{1}{100}$th of a second (10 milliseconds) to minimize tiny vibrations that may cause motion sickness. On the other hand, a satellite navigator may announce an upcoming route of the vehicle in advance through voice guidance so that the passenger may get prepared for a change in the movement of the vehicle. Further, moving up the screen on the display may reduce the symptoms of motion sickness in passengers by about 40%. Further, the seat position may be adjusted for the passenger more susceptible to motion sickness to look out the window easily. On the other hand, the air conditioner may continuously maintain a cooling state of the vehicle to prevent motion sickness.

Studies show that 70% of passengers or more are generally affected by motion sickness to varying degrees. Data on motion sickness, collected by researchers through 24,000 kilometers or more of vehicle driving tests, indicate that the application of new technology effectively mitigates motion sickness by up to 60%.

However, technologies for detecting motion sickness in the related art mostly detect motion sickness through the reactions of passengers, but infants and sleeping passengers may not expressly complain of motion sickness immediately. Further, motion sickness reactions and states differ for each person or seating method, so it is difficult to measure the degree of motion sickness of each individual.

Accordingly, this field of technology needs technology that recognizes the motion sickness of infants and sleepers who cannot expressly complain of motion sickness and mitigate the motion sickness of passengers based thereon.

SUMMARY

The present invention relates to autonomous driving technology and, in particular embodiments, to technology for detecting a motion sickness state of a passenger and optimizing a driving route of a vehicle, rest timing, and vehicle state accordingly.

An embodiment of the present invention provides technology for recognizing motion sickness of infants and sleepers who cannot expressly complain of motion sickness.

Another embodiment of the present invention provides vehicle control technology for learning motion sickness reactions and states different for each person.

Another embodiment of the present invention provides technology for learning motion sickness reactions and states according to the distance of a passenger from the center portion of the vehicle and the forward-looking or backward-looking seating method for an infant.

Another embodiment of the present invention provides technology for optimizing a driving route, rest timing, and vehicle state based on the data learned to prevent motion sickness.

Another embodiment of the present invention provides technology for performing a drive control tailored for an electrified vehicle and adjusting seats by an optimized seating method tailored based on data learned for each specific individual and seating method.

According to an embodiment of the present invention for achieving the objects described above, a method of mitigating motion sickness includes learning a motion sickness prediction model based on state information of a vehicle or the passenger, state information of the passenger, and motion sickness-related information, predicting reactions of the passenger to the current state of the vehicle or the passenger and the possibility of motion sickness using the learned motion sickness prediction model, and optimizing the vehicle state by providing information on motion sickness mitigation methods to the passenger or controlling the vehicle based on the predicted reactions of the passenger and possibility of motion sickness, wherein the motion sickness-related information includes determination result of whether motion sickness occurs to the passenger, motion sickness state information, and motion sickness reaction information.

At this time, the method of mitigating motion sickness may further include acquiring state information of the vehicle or the passenger and reaction information of the passenger and generating the motion sickness-related information based on the state information of the vehicle or the passenger and the reaction information of the passenger before learning the motion sickness prediction model.

At this time, the motion sickness state information may include the state information of the vehicle or the passenger measured before a preset threshold period elapses from the time when motion sickness occurs to the passenger.

At this time, the motion sickness state information may include at least one of the frequency of appearance of slopes and the inclination of the slopes on the current driving road, the frequency of appearance of speed bumps, information on traffic jams, switching to an engine mode in an electrified vehicle during driving, switching to the EV mode in the electrified vehicle during driving, RPM of the engine, a specific braking value (paddle regenerative braking) of the electrified vehicle during driving, the magnitude of change in the vehicle speed, driving distance of the vehicle, the interior temperature of the vehicle, and the degree of shaking of the vehicle, or any combination thereof.

At this time, the motion sickness reaction information may include biometric information of the passenger measured when motion sickness occurs to the passenger or information on the body motions of the passenger.

At this time, the motion sickness reaction information may include motion sickness reaction information different from each other according to the type of passenger, identification information of the passenger, and seating method for the passenger.

At this time, the motion sickness state information may be used for the input of the motion sickness prediction model and the motion sickness reaction information may be used for the output of the motion sickness prediction model in the learning of the motion sickness prediction model.

At this time, the motion sickness mitigating method information may include at least one of the information on an optimal driving route of the vehicle, an optimal rest timing of the vehicle, and an optimized seating method for the passenger, or any combination thereof.

On the other hand, according to an embodiment of the present invention, a system for mitigating motion sickness in a passenger includes a motion sickness state learning unit learning a motion sickness prediction model based on the state information of a vehicle or the passenger, reaction information of the passenger, and motion sickness-related information, a motion sickness state prediction unit predicting the reactions of the passenger to the current state of the vehicle or the passenger and the possibility of motion sickness using the learned motion sickness prediction model, and an information provision and control unit providing motion sickness-related information mitigating methods to the passenger or controlling the vehicle to optimize vehicle state based on the predicted reactions of the passenger and possibility of motion sickness, wherein the motion sickness-related information includes determination result of whether motion sickness occurs to the passenger, motion sickness state information, and motion sickness reaction information.

At this time, the motion sickness mitigation system may further include an information acquisition unit that acquires state information of the vehicle or the passenger and reaction information of the passenger and a motion sickness state recognition unit that generates the motion sickness-related information based on the state information of the vehicle or the passenger and the reaction information of the passenger.

At this time, the motion sickness state information may include state information of the vehicle or the passenger measured before the preset threshold period elapses from the time when motion sickness occurs to the passenger.

At this time, the motion sickness state information may include at least one of the frequency of appearance of slopes and the inclination of the slopes on the current driving road, the frequency of appearance of speed bumps, information on traffic jams, switching to an engine mode in an electrified vehicle during driving, switching to the EV mode in the electrified vehicle during driving, RPM of the engine, a specific braking value (paddle regenerative braking) of the electrified vehicle during driving, the magnitude of change in the vehicle speed, driving distance of the vehicle, the interior temperature of the vehicle, and the degree of shaking of the vehicle, or any combination thereof.

At this time, the motion sickness reaction information may include the biometric information of the passenger measured when the motion sickness occurs to the passenger and the information on the body motions of the passenger.

At this time, the motion sickness reaction information may include motion sickness reaction information different from each other according to the type of passenger, identification information of the passenger, and the seating method for the passenger.

At this time, the motion sickness state prediction unit may use the motion sickness state information for the input of the motion sickness prediction model and use the motion sickness reaction information for the output of the motion sickness prediction model.

At this time, the motion sickness mitigation method information may include at least one of the information on the optimal driving route of the vehicle, the optimal rest timing of the vehicle, and the optimized seating method for the passenger, or any combination thereof.

According to the present invention, the motion sickness of infants and sleepers who cannot expressly complain of motion sickness may be recognized.

Further, motion sickness reactions and states for each person may be learned.

Further, motion sickness reactions and states according to the distance of the passenger from the center portion of the vehicle and the forward-looking or backward-looking seating method for an infant may be learned.

Further, the driving route, rest timing, and vehicle state may be optimized based on the data learned to prevent motion sickness.

Further, a drive control tailored for an electrified vehicle is performed, and an optimized seating method tailored based on the motion sickness data learned for each specific person and each seating method is provided.

BRIEF DESCRIPTION OF THE DRAWINGS

FIG. 4 is a flowchart illustrating a motion sickness mitigation method of a motion sickness mitigation system according to another embodiment of the present invention.

DETAILED DESCRIPTION OF ILLUSTRATIVE EMBODIMENTS

Figure 1:
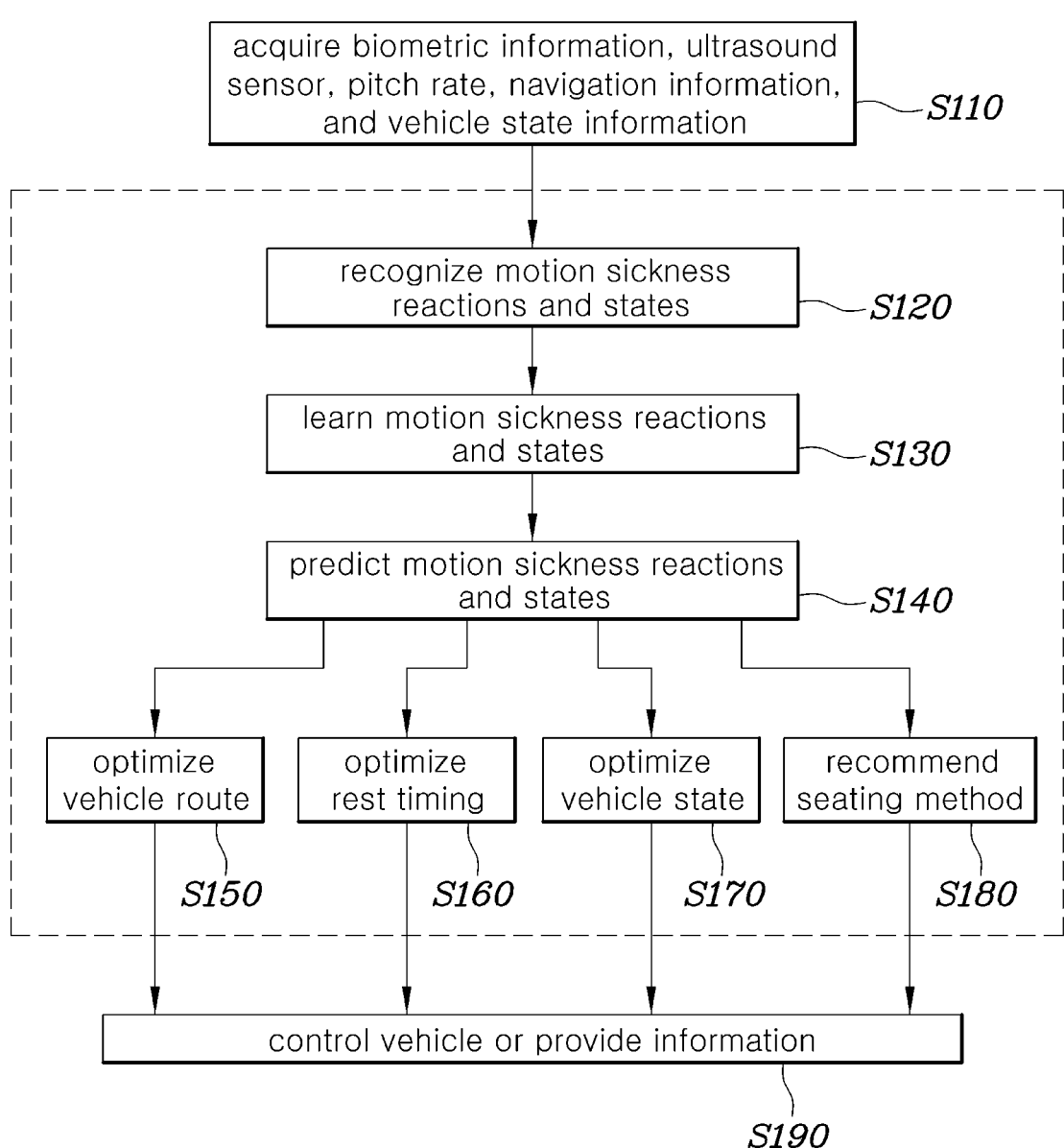
FIG. 1 is a flowchart illustrating a concept of motion sickness mitigation method of a motion sickness mitigation system according to an embodiment of the present invention.

The embodiments disclosed herein will be described in detail with reference to the accompanying drawings. However, the same or similar components will be given the same reference numerals irrespective of the drawing numbers, and the repetitive descriptions will be omitted. The suffixes "module" and "unit" for the components used in the following description are given or interchangeably used only in consideration of the ease of writing the specification and do not have meanings or roles distinct from each other by themselves. Further, when it is determined that the specific description of the related and already known technology may obscure the gist of the embodiments disclosed herein, the specific description will be omitted. Further, it is to be understood that the accompanying drawings are for a better understanding of the embodiment disclosed herein and that the technical ideas disclosed herein are not limited to the accompanying drawings and include all the modifications, equivalents, or substitutes included in the spirit and technical scope of the present invention.

The terms including ordinal numbers such as first, second, and the like may be used to describe various components, but the components are not to be limited by the terms. The terms may only be used for the purpose of distinguishing one component from the other.

It is to be understood that when a component is referred to as being "connected" or "coupled" to another component, the component may be directly connected or coupled to the other component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

FIG. 1 is a flowchart illustrating a concept of a motion sickness mitigation method of a motion sickness mitigation system according to an embodiment of the present invention.

FIG. 1 shows that the motion sickness mitigation system acquires biometric information an ultrasound sensor, a pitch rate, navigation information, and vehicle state information from the outside (S110).

Next, the motion sickness mitigation system recognizes motion sickness reactions and states based on the biometric information, ultrasound sensor, pitch rate, navigation information, and vehicle state information acquired from the outside (S120).

Next, the motion sickness mitigation system learns motion sickness reactions and states based on the motion sickness reactions and states recognized in step S120 (S130).

Next, the motion sickness mitigation system predicts motion sickness reactions and states based on the motion sickness reactions and states learned in step S130 (S140).

The motion sickness mitigation system may optimize the driving route of the vehicle based on the motion sickness reactions and states predicted in step S140 (S150). At this time, the motion sickness mitigation system may generate vehicle route optimization information.

Further, the motion sickness mitigation system may optimize rest timing based on the motion sickness reactions and states predicted in step S140 (S160). At this time, the motion sickness mitigation system may generate rest timing optimization information.

Further, the motion sickness mitigation system may optimize the vehicle state based on the motion sickness reactions and states predicted in step S140 (S170). At this time, the motion sickness mitigation system may generate vehicle state optimization information.

Further, the motion sickness mitigation system may recommend a seating method based on the motion sickness reactions and states predicted in step S140 (S180). At this time, the motion sickness mitigation system may generate seating method information.

Further, the motion sickness mitigation system may control the vehicle or provide information to the passenger based on the vehicle route optimization information, rest timing optimization information, vehicle state optimization information, and seating method recommendation information generated in any one of steps S150 to S180 (S190).

Figure 2:
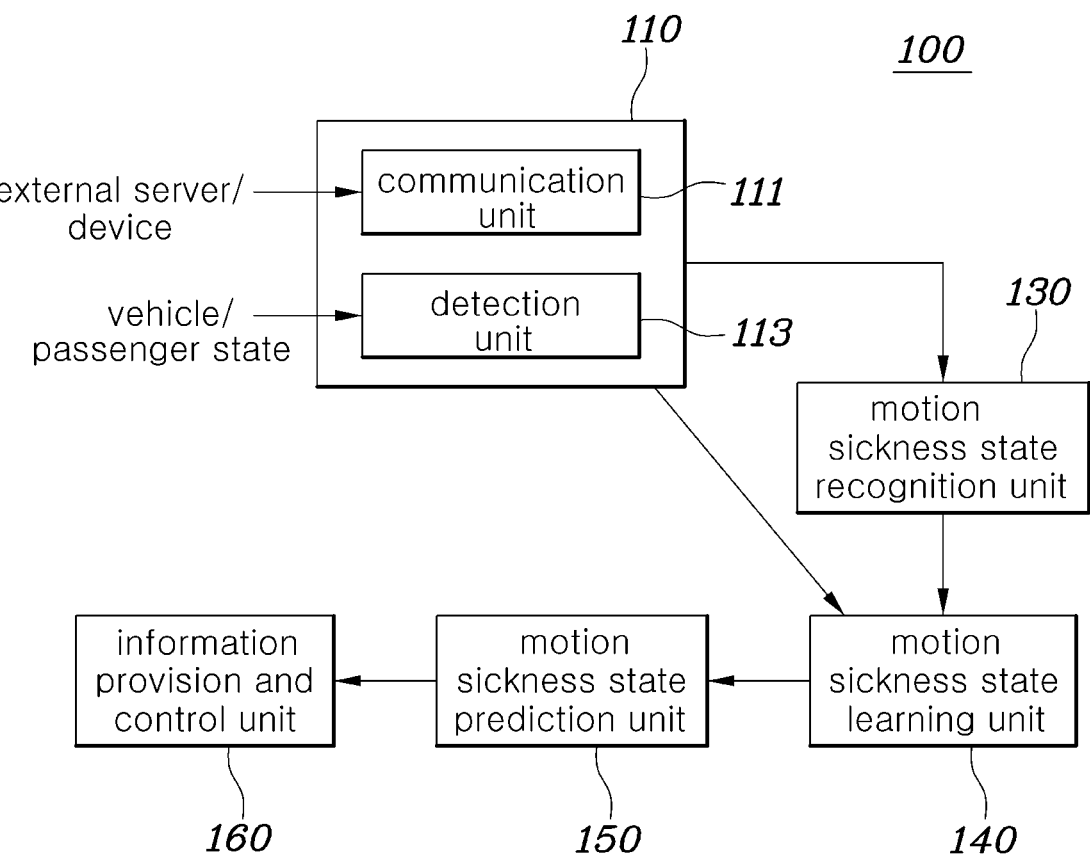
FIG. 2 is a block diagram illustrating a structure of a motion sickness mitigation system according to an embodiment of the present invention.

FIG. 2 is a block diagram illustrating the structure of a motion sickness mitigation system according to an embodiment of the present invention.

FIG. 2 shows that, according to the embodiment, the motion sickness mitigation system 100 includes an information acquisition unit 110, a motion sickness state recognition unit 130, a motion sickness state learning unit 140, a motion sickness state prediction unit 150, and an information provision and control unit 170.

On the other hand, according to the embodiment, the motion sickness mitigation system 100 may be installed in the vehicle or integrally provided with the vehicle.

The information acquisition unit 110 acquires state information of the vehicle or the passenger and reaction information of the passenger and transmits the information to the motion sickness state recognition unit 130 and the motion sickness state learning unit 140.

The information acquisition unit 110 includes a communication unit 111 and a detection unit 113.

The communication unit 111 receives the vehicle state, external environment information, passenger state information, passenger reaction information, and the like from an external server or external device and transmits the information to the motion sickness state learning unit 140.

The communication unit 111 may include an NFC chip, an NFC antenna, a Bluetooth module, a Wi-Fi module, an LTE communication module, a 5G communication module, and the like.

At this time, the state information or reaction information of the passenger may include biometric information of the passenger.

The communication unit 111 may receive biometric information of the passenger through a smartwatch or information on the driving distance of the vehicle through a navigation system of the vehicle.

At this time, the information received through the communication unit 111 may include information on the vestibular organ of the passenger, information on the heart rate, temperature, and the like of the passenger, information on the driving route of the vehicle, information on the RPM of the vehicle engine, information on the driving mode of the vehicle, information on a specific braking value in the case of an electrified vehicle, information on the driving distance of the vehicle, information on the speed and acceleration of the vehicle, and the like.

The detection unit 113 acquires information on the state of the vehicle or passenger from a camera or sensor installed inside or outside the vehicle and transmits the information to the motion sickness state learning unit 140.

At this time, the sensor may include at least one of a weight sensor, a temperature sensor, a GPS sensor, a gyro sensor, and a vibration sensor, or any combination thereof.

For example, the detection unit 113 may acquire information on the pupil and the upper body shaking of the passenger through a camera inside the vehicle.

At this time, the information acquired through the detection unit 113 may include information on the pupil, upper body shaking, yawning, nausea and vomiting, sleep, cold sweat, body motions of the passenger caused by headache or dizziness, the inclination of roads, speed bumps on the road, traffic jam, interior temperature of the vehicle, shaking of the vehicle, and the like.

The motion sickness state recognition unit 130 generates motion sickness-related information based on the state information of the vehicle or passenger and the reaction information of the passenger acquired from the information acquisition unit 110 and transmits the information to the motion sickness state learning unit 140.

At this time, the motion sickness-related information may include the determination result of whether motion sickness occurs, motion sickness state information, and motion sickness reaction information.

At this time, the motion sickness state recognition unit 130 may determine whether motion sickness occurs based on biometric information on the vestibular organ, pupil, upper body shaking, and the like of the passenger.

Further, the motion sickness state recognition unit 130 may determine whether motion sickness occurs based on biometric information on changes in heart rate, body temperatures, and the like acquired through a smartwatch, or the like.

Further, the motion sickness state recognition unit 130 may determine whether motion sickness occurs based on instinctive reactions to motion sickness such as yawning, nausea and vomiting, sleep, headache, cold sweat, dizziness, and the like.

At this time, the motion sickness reaction information may include biometric information of the passenger measured when motion sickness occurs to the passenger and information on the body motions of the passenger.

On the other hand, the motion sickness state recognition unit 130 may generate motion sickness state information based on state information of the vehicle or passenger measured before a preset threshold period elapses from the time when motion sickness occurs.

For example, the motion sickness state information may include information on the frequency of appearance of slopes and the inclination of the slopes on the current driving road, the frequency of appearance of speed bumps, traffic jams, switching to an engine mode in an electrified vehicle during driving, switching to the EV mode in the electrified vehicle during driving, RPM of the engine, a specific braking value (paddle regenerative braking) of the electrified vehicle during driving, the magnitude of change in the vehicle speed, driving distance of the vehicle, the interior temperature of the vehicle, and the degree of shaking of the vehicle.

The motion sickness state learning unit 140 learns a motion sickness prediction model based on the state information of the vehicle or passenger and reaction information of the passenger received from the information acquisition unit 110 and the motion sickness-related information received from the motion sickness state recognition unit 130 and transmits the learned motion sickness prediction model to a motion sickness state prediction unit 150.

At this time, technologies such as AI, machine learning, deep learning, and the like may be used as models for learning.

At this time, the motion sickness state learning unit 140 may perform learning based on the correlation between the biometric information of the passenger. That is, the biometric information in which a change occurs first among the biometric information of the passenger may be used for the input of the model, and the biometric information in which a change occurs later may be used for the output of the model.

For example, a heart rate change of the passenger may be used for the input of the model, and the cold sweat reaction data of the passenger may be used for the output of the model. At this time, the motion sickness state learning unit 140 may learn the correlation between the heart rate change and the cold sweat reaction of the passenger.

Another example may use a pupil change of the passenger for the input of the model and nausea or vomiting reactions of the passenger for the output of the model. At this time, the motion sickness state learning unit 140 may learn the correlation between the pupil change and nausea or vomiting reactions of the passenger.

Another example may use a temperature change of the passenger for the input of the model and yawning or sleep data of the passenger for the output of the model. At this time, the motion sickness state learning unit 140 may learn the correlation between the temperature change and the yawning or sleep data of the passenger.

On the other hand, the motion sickness state learning unit 140 may perform learning based on the correlation between motion sickness state information and motion sickness reaction information. That is, the motion sickness state information may be used for the input of the model, and the motion sickness reaction information may be used for the output of the model.

For example, data on how many times the engine is turned on, how many kilometers are driven, or how many times speed bumps are driven over after the vehicle starts driving may be used for the input of the model, and one of the passenger's motion sickness reaction information may be used for the output of the model.

Another example may use the frequency of acceleration and deceleration and the magnitude of acceleration and deceleration of the vehicle for the input of the model and the nausea or vomiting reactions of the passenger for the output of the model. At this time, the motion sickness state learning unit 140 may learn the correlation between the frequency of acceleration and deceleration and the magnitude of acceleration and deceleration of the vehicle and the nausea or vomiting reactions of the passenger.

Another example may use the distance or time the vehicle travels in the EV mode for the input of the model and the sleep reaction data of the passenger for the output of the model. At this time, the motion sickness state learning unit 140 may learn the correlation between the distance or time that the vehicle travels in the EV mode and the sleep reaction data of the passenger.

Another example may use the RPM of the vehicle for the input of the model and the dizziness reaction data of the passenger for the output of the model. At this time, the motion sickness state learning unit 140 may learn the correlation between the RPM of the vehicle and the dizziness reaction data of the passenger.

Another example may use the distance the vehicle travels at a preset speed or less for the input of the model and the cold sweat reaction of the passenger for the output of the model. At this time, the motion sickness state learning unit 140 may learn the correlation between the distance the vehicle travels at the present speed or less and the cold sweat reaction data of the passenger.

Another example may use whether the vehicle switches from EV mode to engine mode for the input of the model and a heart rate change of the passenger for the output of the model. At this time, the motion sickness state learning unit 140 may learn the correlation between whether the vehicle changes from EV mode to engine mode and the heart rate change of the passenger.

Another example may use whether the vehicle drives over a speed bump for the input of the model and a pupil change of the passenger for the output of the model. At this time, the motion sickness state learning unit 140 may learn the correlation between whether the vehicle drives over a speed bump and the pupil change of the passenger.

Further, the motion sickness state learning unit 140 may learn motion sickness state information and motion sickness reaction information different from each other according to the type of passenger, identification information of the passenger, and seating method for the passenger.

The motion sickness state prediction unit 150 predicts the reactions of the passenger to the current state and the possibility of motion sickness based on the model learned by the motion sickness state learning unit 140 and provides the prediction to the information provision and control unit 160.

At this time, the motion sickness state prediction unit 150 predicts other motion sickness reaction information based on specific motion sickness reaction information or predicts motion sickness reaction information based on motion sickness state information. For example, the motion sickness state prediction unit 150 may catch or predict a motion sickness state of an infant or a sleeper who cannot expressly complain of motion sickness based on motion sickness reaction information or motion sickness state information.

At this time, the motion sickness reaction information may include motion sickness reaction information different from each other according to the type of passenger, the identification information of the passenger, and the seating method for the passenger.

The information provision and control unit 160 generates motion sickness mitigation method information based on the information received from the motion sickness state prediction unit 150 and provides the information to the passenger or controls the vehicle to mitigate motion sickness of the passenger.

Figure 3:
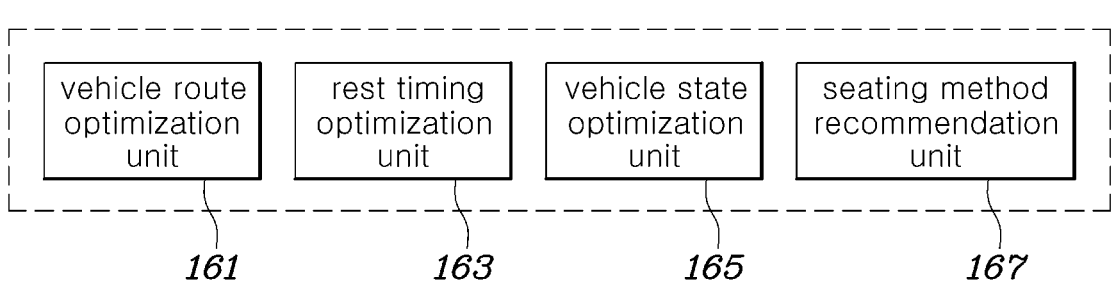
FIG. 3 is a block diagram illustrating the structure of an information provision and control unit in FIG. 2.

FIG. 3 is a block diagram illustrating the structure of the information provision and control unit 160 in FIG. 2

FIG. 3 shows that the information provision and control unit 160 includes a vehicle route optimization unit 161, a rest timing optimization unit 163, a vehicle state optimization unit 165, and a seating method recommendation unit 167.

The vehicle route optimization unit 161 provides an optimal driving route based on the possibility of motion sickness The rest timing optimization unit 163 recommends an optimal rest timing.

Further, the vehicle state optimization unit 165 may optimize the vehicle state by controlling the vehicle.

On the other hand, the seating method recommendation unit 167 recommends an optimized seating method for the passenger.

At this time, the vehicle route optimization unit 161, the rest timing optimization unit 163, and the seating method recommendation unit 167 may provide an optimal driving route, an optimal rest timing, and an optimized seating method for the passenger through audio video navigation (AVN), user equipment of the passenger, and the like installed in the vehicle.

Further, the vehicle state optimization unit 165 may optimize the vehicle state by controlling the vehicle through a vehicle controller. The vehicle route optimization unit 161 may provide the optimal driving route in the following manner, for example.

When the incidence rate of motion sickness exceeds a preset threshold in a driving route with many speed bumps, the vehicle route optimization unit 161 may provide a route with fewer speed bumps to the passenger.

Further, when the incidence rate of motion sickness exceeds a preset threshold in a driving route with many slopes, a driving route with fewer slopes may be provided to the passenger.

Further, when the incidence rate of motion sickness exceeds a preset threshold in long-distance driving, the shortest driving route may be provided to the passenger.

Further, when the incidence rate of motion sickness exceeds a preset threshold at a certain speed or less, a driving route that allows high-speed driving, such as an expressway, may be provided to the passenger.

On the other hand, the rest timing optimization unit 163 may recommend the optimal rest timing in the following manner, for example.

When the incidence rate of motion sickness exceeds a threshold after a preset period elapses from the time when the passenger's heart rate per unit time increases or decreases by a predetermined number or more, the rest timing optimization unit 163 may recommend a rest before the preset period elapses.

Further, when the incidence rate of motion sickness exceeds a threshold after a preset distance or more is driven after the passenger's temperature rises or drops beyond a preset range, a rest may be recommended before the preset distance is driven.

Further, when the incidence rate of motion sickness exceeds a threshold after the vehicle drives over a predetermined number of speed bumps, a rest may be recommended before the predetermined number of speed bumps are driven over.

Further, when the vehicle is driving on an expressway, an optimal rest area where parking is allowed may be searched out and rest is recommended before motion sickness hits. For example, when the incidence rate of motion sickness is expected to exceed a threshold after 10 kilometers are driven ahead while the vehicle is driving on an expressway, the next rest area is 1 kilometer ahead and the rest area after the next is 11 kilometers ahead, the rest area 1 kilometer ahead may be recommended for rest.

On the other hand, the vehicle state optimization unit 165 may optimize the vehicle state in the following manner, for example.

When the incidence rate of motion sickness exceeds a preset threshold while the vehicle is driving for a preset period or more with the RPM maintained within a preset range, the vehicle state optimization unit 165 may optimize the vehicle state such that the vehicle avoids the RPM.

Further, when the interior temperature is within a preset range with a high incidence rate of motion sickness, the vehicle state optimization unit 165 may optimize the vehicle state by controlling the air conditioner such that the vehicle avoids the temperature.

Further, when the body temperature of the passenger is within a preset range with a high incidence rate of motion sickness, the vehicle state optimization unit 165 may optimize the vehicle state by controlling the air conditioner and a seat temperature adjustment function such that the body temperature of the passenger avoids the temperature.

Further, when the incidence rate of motion sickness exceeds a preset threshold while the electrified vehicle drives in the EV mode, the vehicle state may be optimized such that the vehicle drives in the engine mode as much as possible.

Further, when the incidence rate of motion sickness is less than a preset threshold while the electrified vehicle drives in the EV mode, the vehicle state may be optimized such that the vehicle drives in the EV mode as much as possible. At this time, the vehicle state is optimized in conjunction with the rest timing of the vehicle to charge the battery of the vehicle during the rest timing of the vehicle.

Further, when the incidence rate of motion sickness exceeds a preset threshold while the acceleration of the vehicle exceeds a preset range, the vehicle state may be optimized by controlling the power unit of the vehicle to limit acceleration or deceleration.

Further, when the incidence rate of motion sickness exceeds a preset threshold while the speed of the vehicle exceeds a preset range, the vehicle state may be optimized by activating a speed limiter of the vehicle.

Further, in the case of an electrified vehicle, when the incidence rate of motion sickness exceeds a preset threshold at a specific braking value (for example, paddle regeneration stage 3 and the like), the vehicle state may be optimized by fixing the paddle regeneration stage of the vehicle.

Further, the vehicle state optimization unit 165 may control the power unit to drive the vehicle in the optimal state such that the incidence rate of motion sickness is the lowest during autonomous or semi-autonomous driving.

On the other hand, the seating method recommendation unit 167 may recommend an optimized seating method in the following manner, for example.

When a passenger is seated close to the center portion of the vehicle, the seating method recommendation unit 167 may recommend that a passenger with a relatively low incidence rate of motion sickness be seated in the middle of the rear seat.

Further, when the same passenger shows different incidence rates of motion sickness on different seats, it may be recommended that the passenger be seated in the seat with the low incidence rate of motion sickness as much as possible. For example, when the passenger experiences motion sickness in the decreasing order of the left rear seat, right rear seat, and front passenger seat, it may be recommended that the passenger be seated in the front passenger seat.

Further, in the case of an infant, when the incidence rate of motion sickness exceeds a preset threshold when an infant is seated to look backward, it may be recommended that the infant be seated to look forward.

Further, when the incidence rate of motion sickness decreases when the passenger leans against a window, it may be recommended that the passenger lean against the window.

FIG. 4 is a flowchart illustrating a motion sickness mitigation method of a motion sickness mitigation system according to an embodiment of the present invention.

FIG. 4 shows that the motion sickness mitigation system acquires state information of the vehicle or passenger and reaction information of the passenger (S210).

At this time, the information acquisition unit 110 may acquire the state information of the passenger and the reaction information of the passenger.

At this time, the state information or the reaction information of the passenger may include biometric information of the passenger.

Next, motion sickness-related information is generated based on the acquired state information of the vehicle or passenger and the reaction information of the passenger (S230).

At this time, the motion sickness state recognition unit 130 may generate motion sickness-related information.

At this time, the motion sickness-related information may include the determination result of whether motion sickness occurs, motion sickness state information, and motion sickness reaction information.

At this time, the motion sickness state information may include state information of the vehicle or the passenger measured before a preset threshold period elapses from the time when motion sickness occurs to the passenger.

At this time, the motion sickness-related information may include biometric information of the passenger measured when motion sickness occurs to the passenger or information on the body motions of the passenger.

For example, the motion sickness state information may include at least one of the frequency of appearance of slopes and the inclination of the slopes on the current driving road, the frequency of appearance of speed bumps, information on traffic jams, switching to an engine mode in an electrified vehicle during driving, switching to the EV mode in the electrified vehicle during driving, RPM of the engine, a specific braking value (paddle regenerative braking) of the electrified vehicle during driving, the magnitude of change in the vehicle speed, driving distance of the vehicle, the interior temperature of the vehicle, and the degree of shaking of the vehicle, or any combination thereof.

Further, the motion sickness mitigation system learns the motion sickness prediction model based on state information of the vehicle or passenger, reaction information of the passenger, and motion sickness-related information (S250).

At this time, learning the motion sickness prediction model may be performed by the motion sickness state learning unit 140.

At this time, technologies such as AI, machine learning, deep learning, and the like may be used as models for learning.

At this time, learning may be performed based on the correlation between the biometric information of the passenger. That is, the biometric information in which a change occurs first among the biometric information of the passenger may be used for the input of the model, and the biometric information in which a change occurs later may be used for the output of the model.

Further, learning may be performed based on the correlation between motion sickness state information and motion sickness reaction information. That is, motion sickness state information may be used for the input of the model, and motion sickness reaction information may be used for the output of the model.

Further, motion sickness state information and motion sickness reaction information different from each other according to the type of passenger, the identification information of the passenger, and the seating method for the passenger may be learned.

Further, the motion sickness mitigation system predicts the reactions of the passenger and the possibility of motion sickness based on the model learned in step S250 (S270).

At this time, the prediction of the reactions of the passenger and the possibility of motion sickness may be performed by the motion sickness state prediction unit 150.

At this time, other motion sickness reaction information may be predicted based on specific motion sickness reaction information, or motion sickness reaction information may be predicted based on motion sickness state information.

At this time, the motion sickness reaction information may include motion sickness reaction information different from each other according to the type of passenger, the identification information of the passenger, and the seating method for the passenger.

Further, information on the motion sickness mitigation methods is provided or the vehicle is controlled based on the reactions of the passenger and the possibility of motion sickness predicted in step S270 (S290).

At this time, the provision of information on the motion sickness mitigation method or the vehicle control may be performed by the information provision and control unit 160.

At this time, the information on the motion sickness mitigation method may include at least one of the information on the optimal driving route based on the possibility of motion sickness, the optimal rest timing of the vehicle, and the optimized seating method for the passenger, or any combination thereof.

At this time, the optimal driving route, the optimal rest timing, and the optimized seating method for the passenger may be provided through audio video navigation (AVN), user equipment of the passenger, and the like installed in the vehicle.

Figure 5:
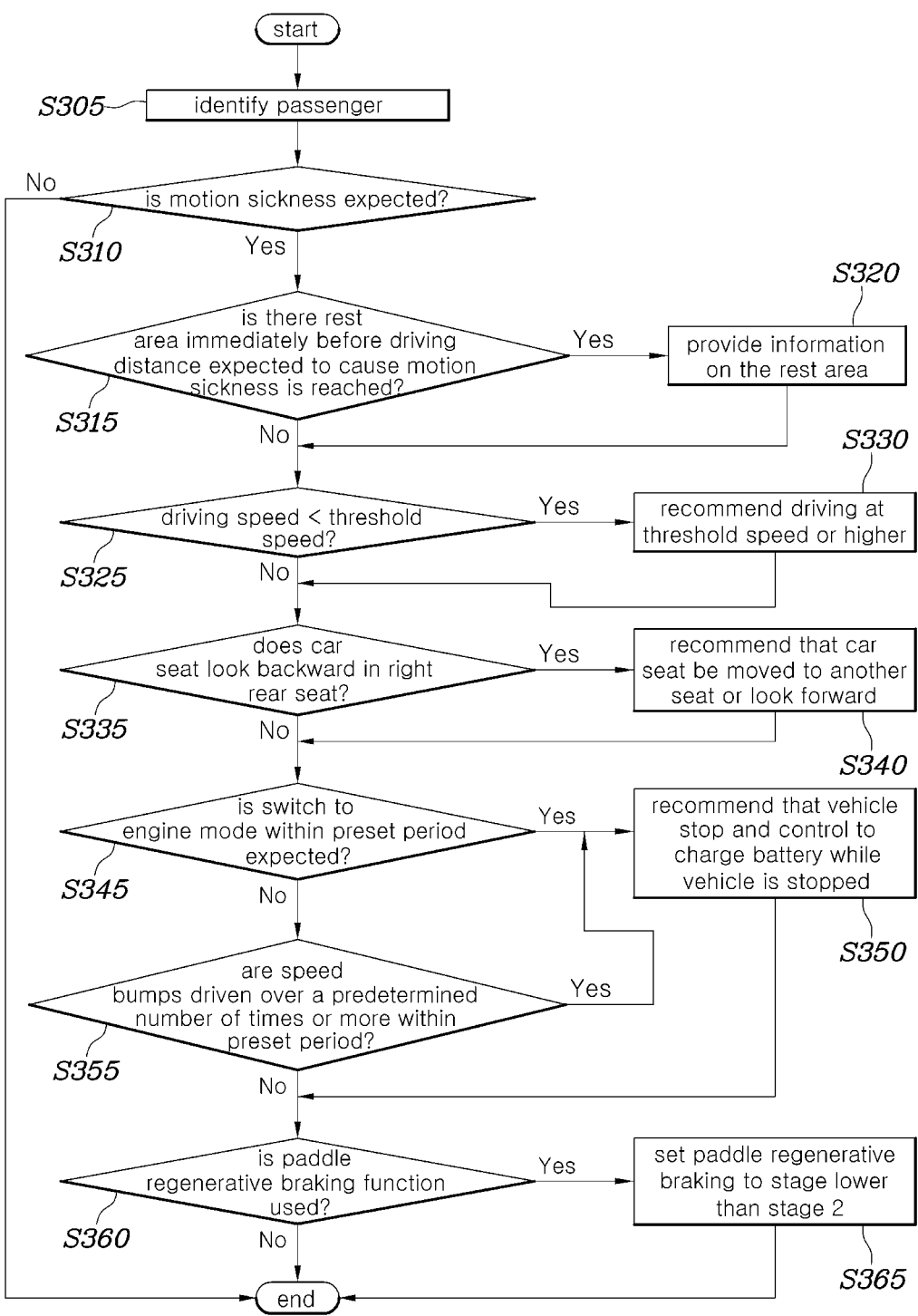
FIG. 5 illustrates an example of a method of providing information and performing vehicle control using a learned model according to an embodiment of the present invention.

FIG. 5 illustrates an example of a method of providing information and performing vehicle control using a learned model of a motion sickness mitigation system according to an embodiment of the present invention.

For example, in the motion sickness mitigation system, learning to reduce the motion sickness of a specific passenger may be completed in advance, and the passenger may be an infant of whom learning is completed and who, as a result of learning, experiences motion sickness when the vehicle drives at less than a preset speed, the infant is seated in a car seat installed in the right rear seat, the driving mode is switched from EV mode to engine mode in an electrified vehicle, speed bumps are driven over a predetermined number of times or more within a preset period, and the paddle regenerative braking function of the vehicle is in stage two.

FIG. 5 shows that the motion sickness mitigation system identifies a passenger (S305) and determines whether the identified passenger is expected to experience motion sickness (S310).

Whether the passenger is expected to experience motion sickness may be determined based on the state of the vehicle or the change in the biometric information of the passenger.

When it is determined in step S310 that motion sickness is expected to occur to the identified passenger, whether there is a rest area immediately before the driving distance expected to cause motion sickness is reached is determined (S315), and information on the rest area is provided when it is determined that there is a rest area (S320).

When it is determined in step S310 that the passenger is not expected to experience motion sickness, the motion sickness mitigation system ends the operation.

On the other hand, the motion sickness mitigation system determines whether the vehicle is driving at a speed lower than a preset threshold speed (S325) and recommends that the vehicle drives at the threshold speed or higher when the current driving speed is less than the threshold speed (S330).

Further, the motion sickness mitigation system determined whether a car seat in which the passenger is seated is installed to look backward in the right rear seat (S335) and, when the car seat is installed to look backward, recommends that the car seat be moved to another seat or be installed to look forward. (S340).

Further, the motion sickness mitigation system determines whether the vehicle is expected to switch from EV mode to engine mode within a preset period (S345) and, when the vehicle is expected to switch to engine mode within the preset period, recommends that the vehicle stop and controls a charging controller of the vehicle to charge the battery while the vehicle is stopped (S350).

Further, the motion sickness mitigation system determines whether the vehicle drives over speed bumps a predetermined number of times or more within a preset period (S335) and, when the vehicle drives over speed bumps a predetermined number of times or more within the preset period, recommends that the vehicle stop and controls the charging controller of the vehicle to charge the battery while the vehicle is stopped (S350).

Further, the motion sickness mitigation system determines whether the vehicle is using the paddle regenerative braking function (S360) and, when the vehicle is using the paddle regenerative braking function, sets the paddle regenerative braking function of the vehicle to a stage lower than stage two (S365).

According to the embodiments of the present invention described above, the motion sickness of an infant and a sleeper who may not expressly complain of motion sickness may be recognized.

Further, motion sickness reactions and states for each person may be learned.

Further, motion sickness reactions and states according to the distance of the passenger from the center portion of the vehicle, the forward-looking or backward-looking seating method for an infant, and the like may be learned.

Further, the driving route, the rest timing, and the vehicle state may be optimized based on the learned data for motion sickness prevention.

Further, driving control tailored for an electrified vehicle is performed, and an optimized seating method tailored based on the motion sickness data learned for each specific person and each seating method is provided.

What is claimed is:

1. A method of operating a vehicle having an electrified vehicle (EV) mode and an engine mode, the method comprising:

learning a motion sickness prediction model based on state information of the vehicle or a passenger, reaction information of the passenger, and motion sickness-related information;

predicting reactions of the passenger to a current state of the vehicle or the passenger and a possibility of motion sickness using the learned motion sickness prediction model; and controlling the vehicle to mitigate motion sickness of the passenger based on the predicted reactions of the passenger and the possibility of motion sickness, wherein the motion sickness-related information comprises one or more of a determination result of whether motion sickness occurs to the passenger, motion sickness state information, and motion sickness reaction information, wherein the motion sickness state information comprises the state information of the vehicle or the passenger measured before a preset threshold period elapses from when motion sickness occurs to the passenger, wherein controlling the vehicle comprises:

determining that the vehicle drives in the EV mode, controlling the vehicle to switch from the EV mode to the engine mode in response to an incidence rate of motion sickness of the passenger exceeding a preset threshold value, and controlling the vehicle to maintain EV mode in response to the incidence rate of motion sickness of the passenger being less than the preset threshold value, and wherein the incidence rate of motion sickness comprises a measure of frequency or likelihood of motion sickness occurring during a driving period.

2. The method of claim 1, further comprising:

acquiring the state information of the vehicle or the passenger and the reaction information of the passenger; and generating the motion sickness-related information based on the state information of the vehicle or the passenger and the reaction information of the passenger before learning the motion sickness prediction model.

3. The method of claim 1, wherein the motion sickness state information comprises one or more of a frequency of appearance of slopes and inclination of the slopes on a current driving road, a frequency of appearance of speed bumps, information on traffic jams, switching to an engine mode in an electrified vehicle during driving, switching to an EV mode in the electrified vehicle during driving, an RPM of an engine, a specific braking value of the electrified vehicle during driving, a magnitude of change in speed of the vehicle, a driving distance of the vehicle, an interior temperature of the vehicle, and a degree of shaking of the vehicle.

4. The method of claim 1, wherein the motion sickness reaction information comprises biometric information of the passenger measured when motion sickness occurs to the passenger and information on body motions of the passenger.

5. The method of claim 4, wherein the motion sickness reaction information comprises motion sickness reaction information different from each other according to a type of passenger, identification information of the passenger, and seating method for the passenger.

6. The method of claim 1, wherein the motion sickness state information is used for an input of the motion sickness prediction model and the motion sickness reaction information is used for an output of the motion sickness prediction model in the learning of the motion sickness prediction model.

7. The method of claim 1, further comprising providing the passenger information, which comprises one or more of an optimal driving route of the vehicle, an optimal rest timing of the vehicle, and an optimized seating method for the passenger.

8. The method of claim 1, wherein controlling the vehicle to mitigate motion sickness of the passenger comprises controlling during autonomous or semi-autonomous driving.

9. The method of claim 1, wherein controlling the vehicle to mitigate motion sickness of the passenger comprises controlling an air conditioner.

10. The method of claim 1, wherein controlling the vehicle to mitigate motion sickness of the passenger comprises controlling a seat temperature.

11. A system for mitigating motion sickness in a passenger riding in a vehicle, the system comprising:

a motion sickness state learning unit configured to learn a motion sickness prediction model based on state information of the vehicle or the passenger, reaction information of the passenger, and motion sickness-related information;

a motion sickness state prediction unit configured to predict reactions of the passenger to a current state of the vehicle or the passenger and a possibility of motion sickness using the learned motion sickness prediction model; and a control unit configured to:

control the vehicle to mitigate motion sickness of the passenger based on the predicted reactions of the passenger and possibility of motion sickness;

determine whether the vehicle drives in an electrified vehicle (EV) mode;

control the vehicle, in response to determining that the vehicle drives in the EV mode, to switch from the EV mode to an engine mode in response to an incidence rate of motion sickness of the passenger exceeding a preset threshold value; and control the vehicle, in response to determining that the vehicle drives in EV mode, to maintain the EV mode in response to the incidence rate of motion sickness of the passenger being less than the preset threshold value, wherein the motion sickness-related information comprises one or more of a determination result of whether motion sickness occurs to the passenger, motion sickness state information, and motion sickness reaction information, wherein the motion sickness state information comprises the state information of the vehicle or the passenger measured before a preset threshold period elapses from when motion sickness occurs to the passenger, and wherein the incidence rate of motion sickness comprises a measure of frequency or likelihood of motion sickness occurring during a driving period.

12. The system of claim 11, further comprising:

an information acquisition unit acquiring the state information of the vehicle or the passenger and the reaction information of the passenger; and a motion sickness state recognition unit generating the motion sickness-related information based on the state information of the vehicle or the passenger and the reaction information of the passenger.

13. The system of claim 11, wherein the motion sickness state information comprises one or more of a frequency of appearance of slopes and inclination of the slopes on a current driving road, a frequency of appearance of speed bumps, information on traffic jams, switching to an engine mode in an electrified vehicle during driving, switching to an EV mode in the electrified vehicle during driving, an RPM of an engine, a specific braking value of the electrified vehicle during driving, a magnitude of change in speed of the vehicle, a driving distance of the vehicle, an interior temperature of the vehicle, and a degree of shaking of the vehicle.

14. The system of claim 11, wherein the motion sickness reaction information comprises biometric information of the passenger measured when motion sickness occurs to the passenger or information on body motions of the passenger.

15. The system of claim 14, wherein the motion sickness reaction information comprises motion sickness reaction information different from each other according to a type of passenger, identification information of the passenger, and seating method for the passenger.

16. The system of claim 11, wherein the motion sickness state prediction unit uses the motion sickness state information for an input of the motion sickness prediction model and the motion sickness reaction information for an output of the motion sickness prediction model.

17. The system of claim 11, wherein the control unit is configured to provide information on one or more of an optimal driving route of the vehicle, an optimal rest timing of the vehicle, and an optimized seating method for the passenger, or any combination thereof.

18. The system of claim 11, wherein the vehicle comprises an autonomous driving vehicle that includes a power unit and wherein the control unit is configured to control the power unit to drive the vehicle in a state to lower the incidence rate of motion sickness during autonomous driving.

19. The system of claim 11, further comprising an air conditioner, wherein the control unit is configured to control the air conditioner to mitigate motion sickness of the passenger.

20. The system of claim 19, further comprising a passenger seat, wherein the control unit is further configured to control a seat temperature adjustment function of the passenger seat to mitigate motion sickness of the passenger.

\* \* \* \* \*